United States Patent [19]

Cooke, II

[11] Patent Number: 5,344,185
[45] Date of Patent: Sep. 6, 1994

[54] AIR BAG COVER DOOR HORN SWITCH AND COVER BAND

[75] Inventor: Robert L. Cooke, II, Dover, N.H.
[73] Assignee: Davidson Textron Inc., Dover, N.H.
[21] Appl. No.: 192,342
[22] Filed: Feb. 7, 1994
[51] Int. Cl.5 ............................................ B60R 21/16
[52] U.S. Cl. .................................. 280/731; 200/61.54
[58] Field of Search .............. 280/728 R, 731, 750; 200/61.54–61.57

[56] References Cited

U.S. PATENT DOCUMENTS

| | | | |
|---|---|---|---|
| 4,598,602 | 7/1986 | Kurata et al. | 200/61.54 X |
| 4,785,144 | 11/1988 | Fosnaugh et al. | 280/731 |
| 5,001,311 | 3/1991 | Sakaue | 200/61.54 X |
| 5,002,306 | 3/1991 | Hiramitsu et al. | 280/731 |
| 5,085,462 | 2/1992 | Gualtier | 280/731 |
| 5,149,127 | 9/1992 | Manake et al. | 280/731 |
| 5,186,490 | 2/1993 | Adams et al. | 280/731 |
| 5,265,905 | 11/1993 | Shelton | 280/731 |
| 5,294,149 | 3/1994 | Edge | 280/731 X |

*Primary Examiner*—Karin L. Tyson
*Assistant Examiner*—Christopher P. Ellis
*Attorney, Agent, or Firm*—Reising, Ethington, Barnard, Perry & Milton

[57] ABSTRACT

A steering wheel mounted air bag cover door (10) includes a horn switch (20) disposed on its outside surface (16) for actuating a vehicle horn (40) in response to the application of a predetermined horn actuating force to the cover door. The horn switch (20) is spaced apart laterally from the tear seam (18) on the cover door (10). A cover band (22) extends over and conceals the horn switch (20), the cover band also being spaced apart laterally from the tear seam (18). The cover band (22) includes a removable attachment feature (26) whereby the cover band may be removed easily from the cover door (10) to replace the horn switch (20). An adjustment feature (28) enables one to adjust the distance between the cover band (22) and the cover door (10) to prevent pinching of the horn switch (20).

13 Claims, 2 Drawing Sheets

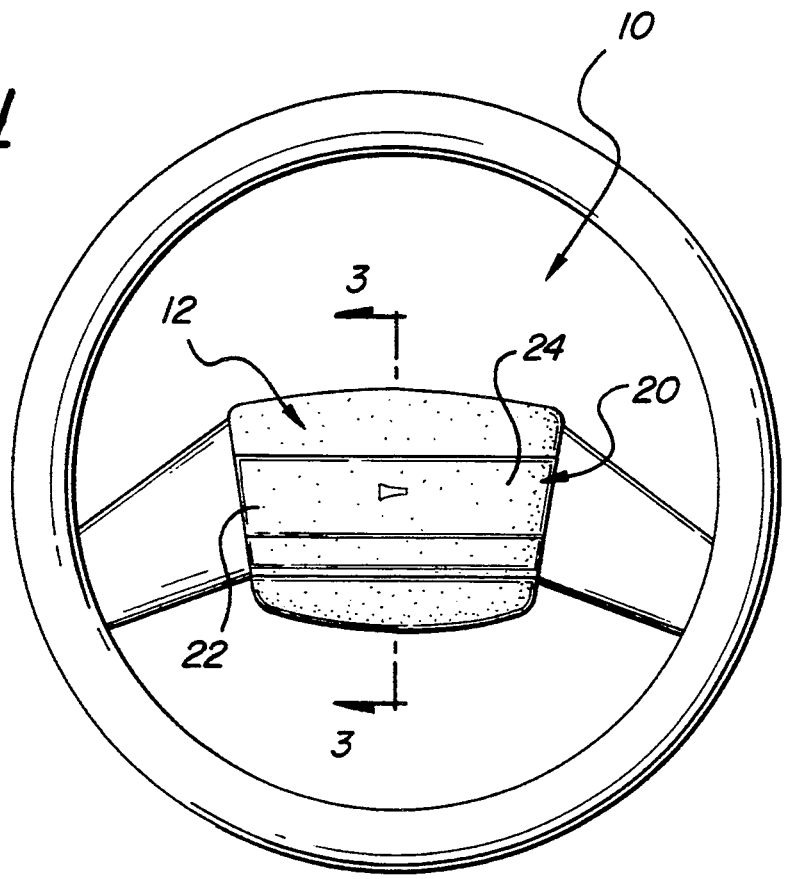
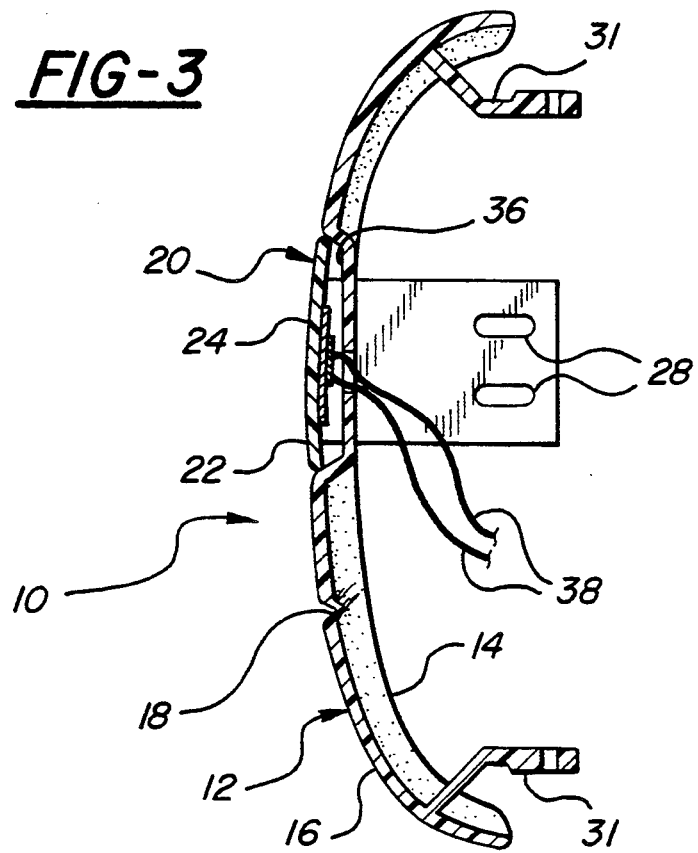

AIR BAG COVER DOOR HORN SWITCH AND COVER BAND

TECHNICAL FIELD

The subject invention relates to horn blowing switch arrangements on the steering wheel column of a motor vehicle, and more particularly to horn switch arrangements for use on a steering wheel column having an inflatable air bag assembly.

BACKGROUND OF THE INVENTION

Since the advent of steering column air bag assemblies, engineers have struggled with designs for a horn switch. Air bag cover doors, located in the center of the steering column where horn switches had been located, require that old horn switches be moved or modified to accomodate the air bag assembly. This is because the cover doors cover and retain the air bag assembly in place and because the cover door must rupture in a predetermined fashion. Initially, designers were reluctant to place switches on the cover door itself, fearing that the switch may interfere with the rupturing of the cover door when the air bag activated, or worse, that the switch may fly off the door and injure the occupants of the vehicle. Some designers placed the horn switch behind the cover door, but this made repair and replacement of the switch difficult and expensive. Other designers placed one or more horn switches on the sides of the cover door; but drivers in emergency situations have difficulty finding the switch, and instead jam their palms onto the insensitive and mute cover door in a futile attempt to berate the mischievous pedestrian or motorist they happen to encounter.

U.S. Pat. No. 5,002,306 to Hiramitsu et al. teaches an air bag cover door with a horn switch mounted thereon. The horn switch is safely spaced away from the tear seam of the cover door, and thus will not interfere with its rupturing; but the switch is molded into the surface of the cover door and cannot be replaced easily.

U.S. Pat. No. 5,186,490 to Adams et al. also teaches an air bag cover door with a horn switch disposed thereon. The horn switch is replaceable; but the switch cover for the switch extends over the cover door tear seam, and seems likely to interfere with the rupturing of the cover door. Moreover, the switch cover is unnecessarily complicated, being in two pieces where one of the pieces is permanently molded onto the cover door.

SUMMARY OF THE INVENTION AND ADVANTAGES

A cover door is disclosed for a steering wheel mounted air bag assembly of the type which breaks open when the air bag is activated. The cover door comprises a top wall including an outer periphery defining an inside surface facing the air bag assembly when the cover door is installed and an oppositely disposed outside surface, the top wall being made from a predetermined material. The top wall includes at least one tear seam comprising material which is mechanically weaker than the predetermined material. The cover door also includes horn switching means disposed adjacent the outside surface for generating an electrical signal in response to a predetermined horn actuating force being applied to the horn switching means, the horn switching means being spaced between the at least one tear seam and the periphery. A cover band extends over and conceals the horn switching means, the cover band being located between the periphery and the tear seam. The cover band includes an outer surface directly accessible to engagement by a driver's hand for applying a force through the cover band for generating the predetermined horn actuating force. The cover band finally includes removable attachment means for moving between an engaged position in which the cover band is fixed with respect to the cover door and a disengaged position in which the cover band is not fixed with respect to the cover door whereby the cover band may be removed from the cover door to replace the horn switching means.

This invention provides a simple and inexpensive horn switch for use on an air bag cover door which is easily removable and which will not interfere with the operation of the air bag.

FIGURES IN THE DRAWINGS

Other advantages of the present invention will be readily appreciated as the same becomes better understood by reference to the following detailed description when considered in connection with the accompanying drawings wherein:

FIG. 1 is a top view of a vehicle steering wheel assembly showing the subject air bag cover door;

FIG. 3 is a cross-sectional view of the air bag cover door alone taken along line 3—3 of FIG. 1.

DESCRIPTION OF THE PREFERRED EMBODIMENT

Figure 2:
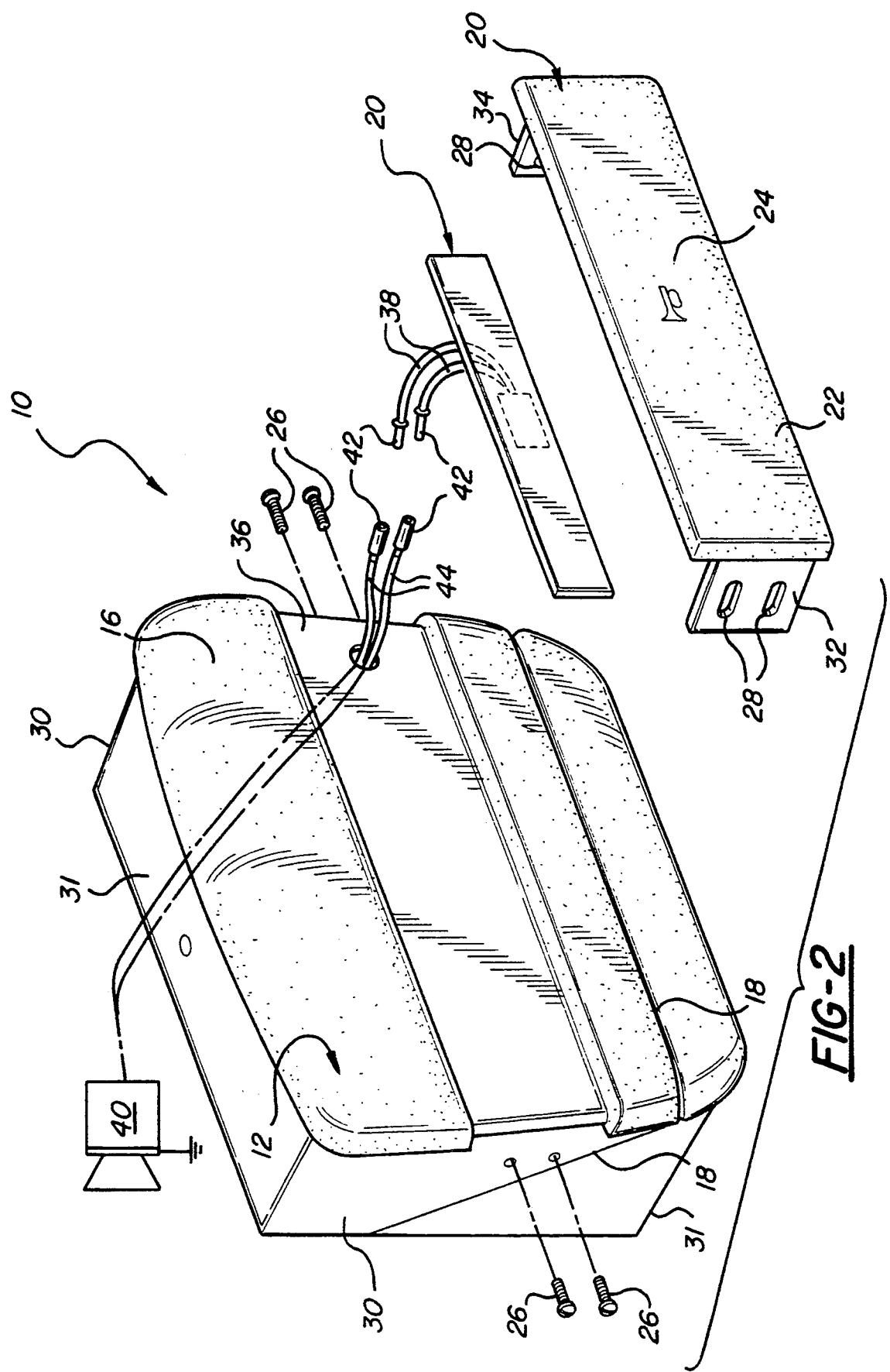
FIG. 2 is an exploded view of the air bag cover door showing the horn switch, the cover band and the adjustment means.

Referring to the Figures wherein like numerals indicate like or corresponding parts throughout the several views, a cover door for a steering wheel mounted air bag assembly is generally shown at 10.

The cover door 10 comprises a top wall 12 including an outer periphery which defines an inside surface 14 facing the air bag assembly when the cover door is installed and an oppositely disposed outside surface 16. The outside surface 16 faces outwardly into the passenger compartment. The top wall 12 is made from a predetermined material, typically an organic polymeric material, i.e. a plastic.

The top wall 12 includes at least one tear seam 18 comprising material which is mechanically weaker than the predetermined material. In the typical case, the seam 18 is mechanically weaker because the material is thinner along the seam than elsewhere in the top wall 12. This practice is old and well-known in the art and not significantly related to the subject invention. The prior art also includes various tear seam configurations: some, as shown in U.S. Pat. No. 5,085,462 to Gualtier, include a single seam across the outside surface; others involve more complex patterns such as an "H" pattern as taught in U.S. Pat. Nos. 5,002,306 and 5,186,490. The subject invention can be adapted to work in combination with a number of tear seam configurations; however, the subject invention is most easily adapted to work with the single seam configuration 18.

Horn switching means 20 is disposed adjacent the outside surface 16 for generating an electrical signal in response to a predetermined horn actuating force being applied to the horn switching means 20, the horn switching means being spaced between the at least one tear seam 18 and the periphery. The horn switching means or more simply, "horn switch," 20 can be any one of a number of known switching mechanisms. For example, it could comprise a membrane switch, a piezo electric device, or a force sensitive resistor.

A cover band 22 extends over and conceals the horn switch 20, the cover band being located between the periphery and the tear seam 18. The cover band 22 includes an outer surface 24 directly accessible to engagement by a driver's hand which can apply a force through the cover band 22 for generating the predetermined horn actuating force. The cover band 22 includes removable attachment means 26 for moving between an engaged position in which the cover band 22 is fixed with respect to the cover door 10 and a disengaged position in which the cover band 22 is not fixed with respect to the cover door 10 whereby the cover band may be removed from the cover door 10 to replace the horn switching means 20.

The cover band 22 is spaced apart from the outside surface 16 to define a gap, the assembly including adjustment means 28 for adjusting the cover band 22 with respect to the outside surface 16 to adjust the gap and provide clearance for the horn switch 20 when the horn switch is installed so that the horn switch is not pinched by the cover band 22 and the outside surface 16. This pinching can occur if the gap is narrow and the horn switch 20 is relatively large due to being manufactured at the high end of its tolerance range.

The attachment means 26 includes a plurality of removable fasteners each having a predetermined diameter, the fasteners 26 extending through the cover band 22 and into the cover door 10 to fasten the cover band 22 to the cover door. The fasteners 26 extend through the flanges to secure the cover band 22 to the cover door 10. The fasteners 26 are preferably simple screws.

The cover door 10 includes at least one side wall 30 extending away from the inside surface 14 of the top wall 12. The side wall 30 together with the top wall 12 defines a structure having somewhat of a "U" shape with the inside surface 14 being on the inside of the bottom of the "U", and the outside surface 16 being on the outside of the bottom of the "U". In the preferred embodiment, the cover door 10 includes two oppositely disposed side walls 30. The cover door may also include two other oppositely disposed side walls 31 as shown in the figures. The cover door 10 attaches to the steering column at its side walls 30,31 in ways commonly practiced and well known in the art.

The cover band 22 includes an elongated strip having first and second ends, with the cover band 22 including a first flange 32 extending down from the first end of the strip and a second flange 34 extending down from the second end of the strip, the first and second flanges 32,34 being disposed adjacent to at least one side wall 30. In the preferred case, one flange 32 is disposed adjacent one of the side walls 30 and the other 34 is disposed adjacent the other of the side walls 30. The cover band 22 is made from material which will either match or complement the cover door 10 itself. The band 22 may be a metal such as aluminum or it may be a plastic of some sort to closely match the cover door 10.

The adjustment means 28 includes at least one hole through each of the first and second flanges 32,34 to recieve the fasteners 26, the at least one hole 28 having a dimension larger than the diameter of the fasteners 26 to allow the cover band 22 to be attached to the cover door 10 in a number of positions relative to the cover door.

The at least one hole 28 may be an elongated slot having a width slightly larger than the diameter of one of the fasteners 26 and a length substantially larger than the diameter, i.e. several times as large as the diameter. With such an adjustment means 28, the cover band 22 can be loosely attached to the cover door 10 with the screws, and then slid up and down with respect to the cover door 10 to adjust the gap before the screws are tightened, fixing the cover band 22 in place with respect to the cover door.

The outside surface 16 defines an elongated channel 36 extending across the top wall 12, the horn switching means 20 and the cover band 22 being disposed in the channel 36. The channel 36 is rectangular in shape as shown in figures. The channel 36 is deep enough so that the top of the cover band 22, when installed, can be flush with the outside surface 16 of the cover door 10 and not pinch the horn switch 20.

At least one wire lead 38 extends from the horn switch 20 and connects to a horn assembly 40 located in the vehicle. In the preferred embodiment, the horn switch 20 includes some wire leads 38 with a connector 42 to matingly connect with wires 44 which extend out from the steering column of the given vehicle. The idea is to have some type of quick connect for the wiring of the horn switch 20.

The horn switch 20 is attached to the cover band 22. This makes for a unitary horn switching mechanism which can be easily installed and removed. In such a case the horn switch 20 may not even contact the outside surface 16 of the cover door 10, being suspended above it by the cover band 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A cover door assembly (10) for a steering wheel mounted air bag assembly of the type which breaks open when the air bag is activated, said cover door comprising:

a top wall (12) including an outer periphery defining an inside surface (14) facing the air bag assembly when said cover door (10) is installed and an oppositely disposed outside surface (16), said top wall (12) being made from a predetermined material;

said top wall (12) including at least one tear seam (18) comprising material which is mechanically weaker than said predetermined material;

horn switching means (20) disposed adjacent said outside surface (16) for generating an electrical signal in response to a predetermined horn actuating force being applied to said horn switching means (20), said outside surface defining an elongated channel (36) extending across said top wall (12), said horn switching means being disposed in said channel;

a cover band (22) extending over and concealing said horn switching means (20), said cover band (22) including an outer surface directly accessible to engagement by a driver's hand for applying a force through said cover band (22) for generating the predetermined horn actuating force;

said cover band (22) including removable attachment means for moving between an engaged position in which said cover band (22) is fixed with respect to said cover door (10) and a disengaged position in which said cover band (22) is not fixed with respect to said cover door (10) whereby said cover band may be removed from said cover door (10) to replace said horn switching means (20), said cover band (22) includes an elongated strip having first and second ends and said attachment means includes a first flange extending from said first end and a second flange extending from said second end.

2. An assembly (10) as set forth in claim 1 further characterized by said cover band (22) being spaced apart from said outside surface (16) to define a gap, said assembly (10) including adjustment means (28) for adjusting said cover band (22) with respect to said outside surface (16) to adjust the gap and provide clearance for said horn switching means (20) when said horn switching means is installed so that said horn switching means is not pinched by said cover band (22) and said outside surface (16).

3. An assembly (10) as set forth in claim 2 further characterized by said attachment means (26) including a plurality of removable fasteners each having a predetermined diameter, said fasteners (26) extending through said cover band (22) and into said cover door (10) to fasten said cover band (22) to said cover door (10).

4. An assembly (10) as set forth in claim 3 further characterized by said cover door (10) including at least one side wall (30) extending away from said inside surface (14) of said top wall (12).

5. An assembly (10) as set forth in claim 4 further characterized by said first and second flanges (32,34) being disposed adjacent said at least one side wall (30).

6. An assembly (10) as set forth in claim 5 further characterized by said fasteners (26) extending through said flanges to secure said cover band (22) to said cover door (10).

7. An assembly (10) as set forth in claim 6 further characterized by said adjustment means (28) including at least one hole through each of said first and second flanges (32,34) to receive said fasteners (26), said at least one hole (28) having a dimension larger than said diameter of said fasteners (26) to allow said cover band (22) to be attached to said cover door (10) in a number of positions.

8. An assembly (10) as set forth in claim 7 further characterized by said at least one hole (28) being an elongated slot having a width larger than said diameter of one of said fasteners (26).

9. An assembly (10) as set forth in claim 8 further characterized by including at least one wire lead (38) extending from said horn switching means (20) and connected to a horn assembly (40) located in the vehicle.

10. An assembly (10) as set forth in claim 9 further characterized by said horn switching means (20) comprising a membrane switch.

11. An assembly (10) as set forth in claim 9 further characterized by said horn switching means (20) comprising a piezo electric device.

12. An assembly (10) as set forth in claim 9 further characterized by said horn switching means (20) comprising a force sensitive resistor.

13. An assembly (10) as set forth in claim 1 further characterized by said horn switching means (20) being attached to said cover band (22).

* * * * *